Jan. 13, 1959  H. JOHNSON ET AL  2,868,161
APPARATUS FOR APPLYING STRIPES OF THERMOPLASTIC
CEMENTS TO FLAT BLANKS
Filed July 5, 1955  3 Sheets-Sheet 1

*Inventors*
Herbert Johnson
George F. C. Burke
By their Attorney

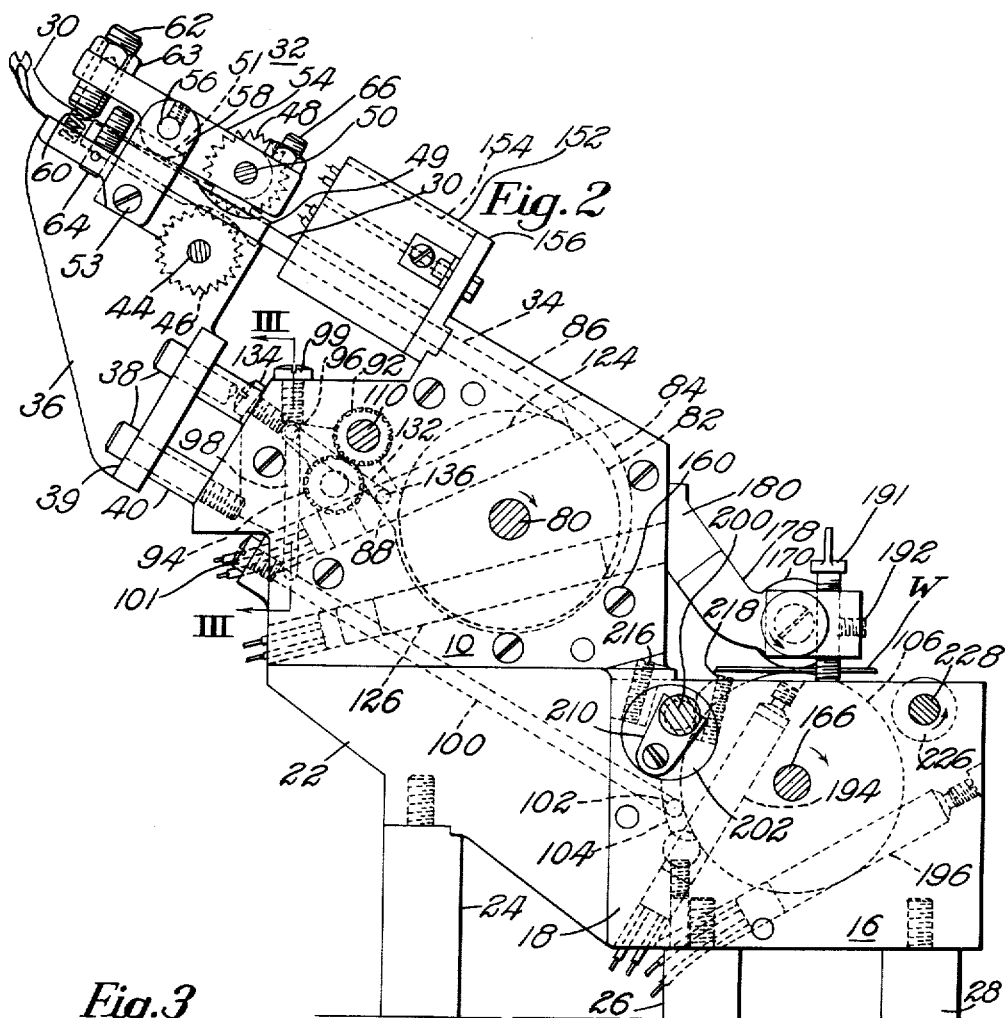
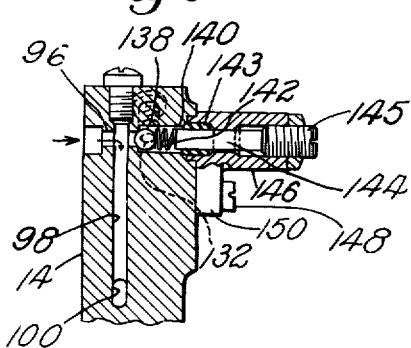
Fig. 2
Fig. 3
Inventors
Herbert Johnson
George F. C. Burke
By their Attorney

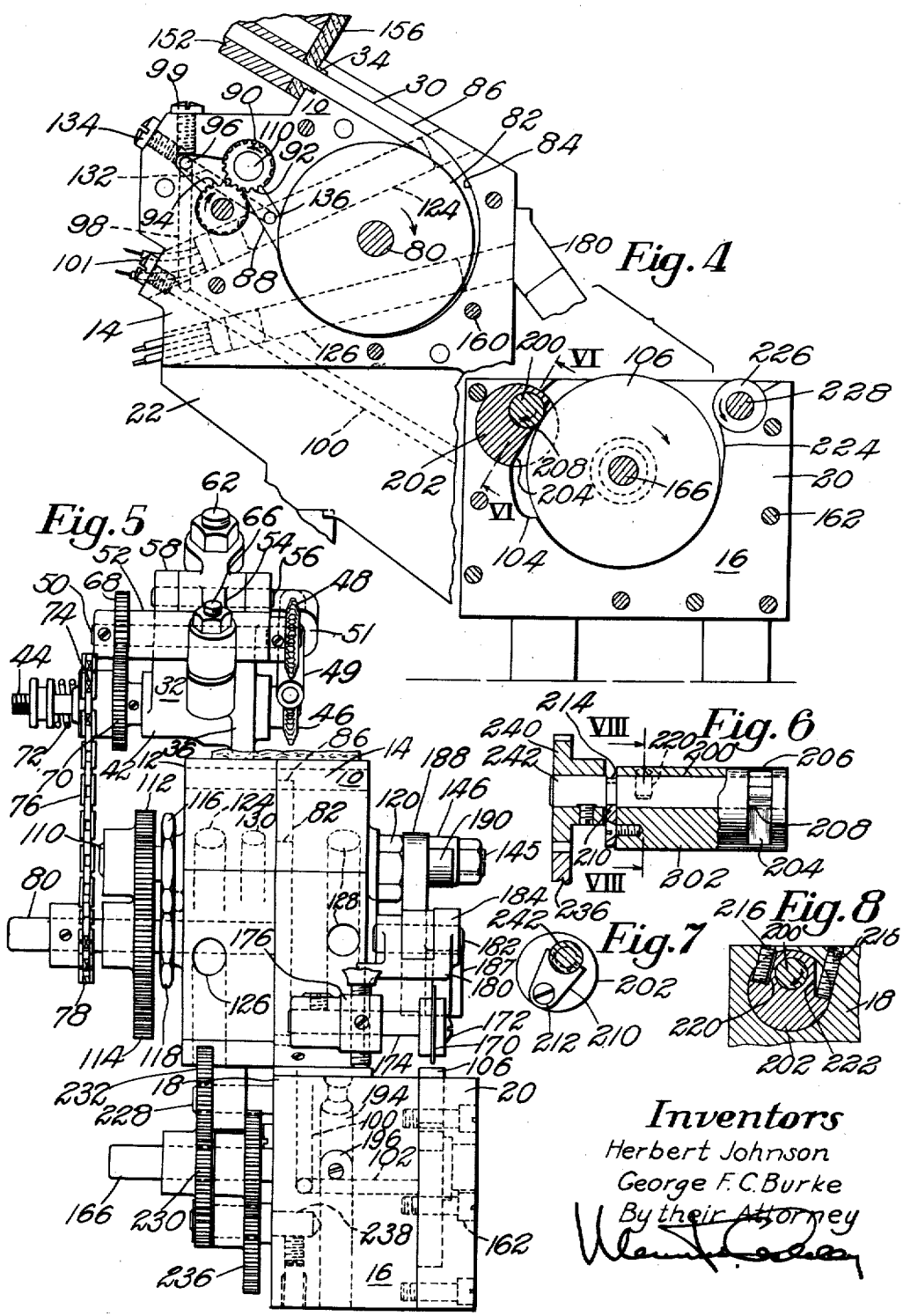

United States Patent Office 2,868,161
Patented Jan. 13, 1959

2,868,161

APPARATUS FOR APPLYING STRIPES OF THERMOPLASTIC CEMENTS TO FLAT BLANKS

Herbert Johnson and George F. C. Burke, Beverly, Mass., assignors to United Shoe Machinery Corporation, Flemington, N. J., a corporation of New Jersey Application July 5, 1955, Serial No. 519,844

3 Claims. (Cl. 118—202)

This invention relates to apparatus for applying stripes of thermoplastic cement to flat blanks and is herein illustrated as embodied in an apparatus using cement in rod form as from a supply in the form of a coil, delivering it to a melting unit and transferring it to an applying unit in which a thin applying disk projects slightly from the upper face of the unit so that a relatively narrow stripe of cement is applied to the under side of the margins of flat blanks presented to it in rapid succession.

One field of use for an apparatus of this kind is in connection with a body-making machine designed to take such a flat blank and curl it into a cylinder in which the stripe of cement is depended upon to form a side seam and to set so quickly that the cylindrical bodies may be removed from the apparatus and closed by the application of top and bottom pieces which are crimped to the ends of the body. Machines of a similar nature have long been in use in the preparation of metal cans and are provided with a blank feeding mechanism designed to present one margin of each successive blank to the apparatus for applying the adhesive. In the case of metal can bodies, the side seam is formed by soldering and one well-known machine has been refined to such an extent that approximately 300 small blanks per minute are passed through the feeding and forming mechanisms.

By employing a thermoplastic cement of suitable composition, which is applied in a thin layer handled at temperatures of from 300 to 400° F., the setting time is reduced to a small fraction of a second and a seam of very considerable strength is obtained. Inasmuch as the cement must be in a liquid state when delivered to the applying disk, it has been found desirable, in order to melt the solid cement at a rate fast enough to maintain a suitable supply to the applying disk, to utilize an invention disclosed in United States Letters Patent No. 2,765,768, granted October 9, 1956, upon an application of Hans C. Paulsen for Improvements in Cement Handling Apparatus, in which a rotary disk within a chamber in a heated casing is employed for the melting and feeding of the cement. Such a disk, however, must be driven at a much slower speed than the 600 R. P. M. required of the applying disk when treating the quantity of work indicated above and we have taken advantage of the two unit arrangement, with separately driven melting and applying disks, which is disclosed and claimed in an application of Hans C. Paulsen, Serial No. 512,146, filed May 31, 1955 for Machines for Applying Heated Thermoplastic Adhesives.

Accordingly, the object of this invention is to provide an improved and efficient arrangement of the melting and the applying units required for uses such as the particular example which is outlined above.

One feature of the invention resides in the provision of two casings for the driven disks of the respective units, which units are staggered laterally and vertically so that a recessed disk-receiving plate of the melting unit is alined with and preferably made integral with a cover plate of the applying unit and is at a different elevation.

Another feature of the invention lies in improved means for controlling the quantity of adhesive carried out to the work by the applying disk and as herein illustrated this control means comprises a driven doctor roll which is journaled in an eccentric bushing rotatably mounted in the casing of the applying unit and capable of being turned in easily controlled degrees, to move the doctor roll toward and away from the peripheral surface of the applying disk, as by means of adjusting screws resting upon surfaces formed in opposite sides of the axis of the bushing.

These and other features of the invention will best be understood from a consideration of the following specification, taken in connection with the accompanying drawings, in which Fig. 1 is a front elevation of the apparatus;

Fig. 2 is a similar view showing the melting disk and its pump and the applying roll and its control, with the driving mechanism for the respective parts removed;

Fig. 3 is a fragmentary view of the by-pass control taken on the line III—III of Fig. 2;

Fig. 4 is a view similar to Fig. 2 but with the cover portions removed to expose the recessed portions of the casings containing the driven members;

Fig. 5 is a side elevation taken from the right side of Fig. 1;

Fig. 6 is a section through the doctor roll bushing on the line VI—VI in Fig. 4;

Fig. 7 is a detail view of a retainer which holds the doctor roll and its bushing in correct endwise relation; and Fig. 8 is a fragmentary vertical section on the line VIII—VIII of Fig. 6 through the adjusting screws for the doctor roll bushing.

Figure 1:
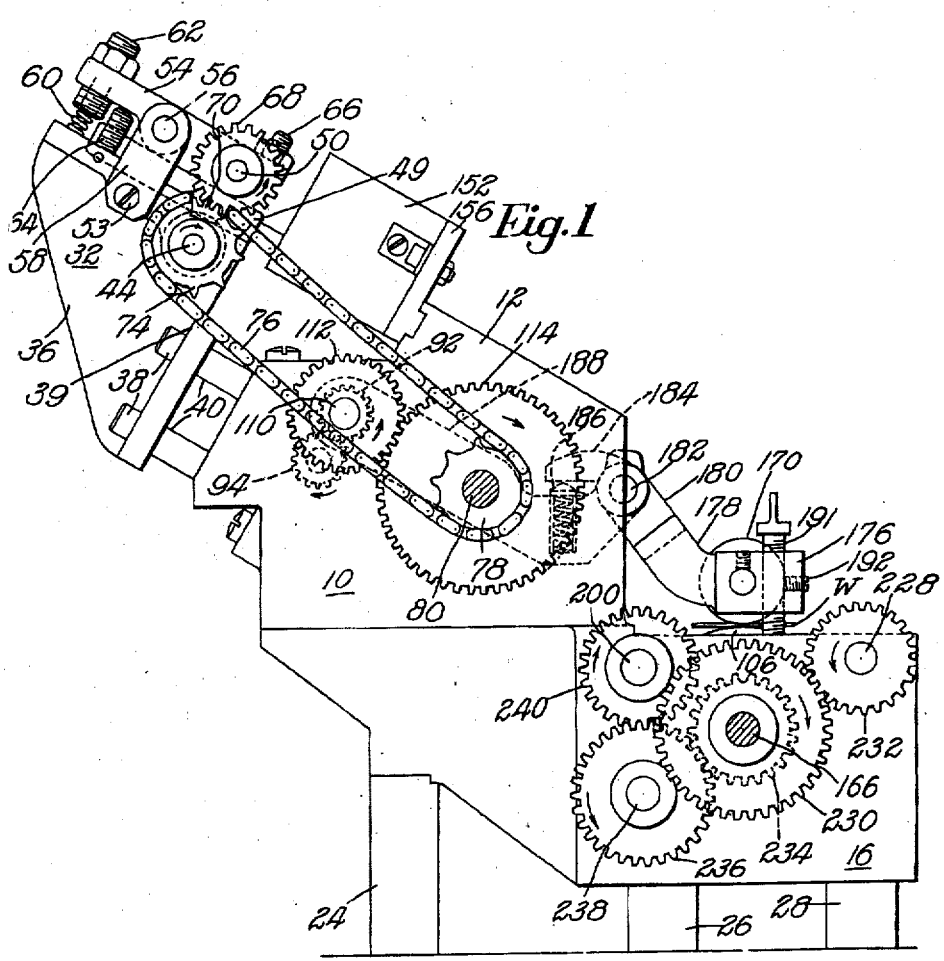

It will be seen from Figs. 1 and 5 that the apparatus comprises a melting unit 10 having a casing made up of a front cover 12 and a recessed rear plate 14 and an applying unit 16 having a casing which comprises a front cover 18 and a recessed rear plate 20. These units are offset, or staggered, vertically and laterally so that the recessed rear plate 14 of the melting unit 10 has its inner face in the same plane with the front face of the front cover 18 of the applying unit 16 and the two are integral, being interconnected by means of a plate-like member 22 which is about as thick as the recessed rear plate 14. These casings are provided with legs 24, 26 and 28 which may be attached to any suitable portion of the work handling machine to which this apparatus is applied.

The apparatus is designed to handle thermoplastic cement, as in the form of a grooved rod 30, and a feeding device 32 is provided to deliver this rod cement to the inlet 34 (Fig. 4) of the melting unit 10. This feeding device 32 comprises a bracket 36 which is supported upon the cover portions 12 of the casing of the melting unit by means of screws 38 through a flange 39 on the bracket and spacer bushing 40. The bracket 36 has incorporated in it a bearing 42 for a shaft 44, upon the far end of which is carried a lower feed wheel 46. An upper feed wheel 48 coacting with the lower to grip and feed the rod is supported upon the inner end of a shaft 50 journaled in an enlarged cross piece 52 forming a portion of an arm 54 tiltably supported upon a pivot pin 56 which is carried by two upstanding arms 58 upon the bracket 36.

This arm 54 is urged clockwise by a spring 60 the lower end of which is seated in a portion of the bracket 36 while its upper end is received within a hollow screw 62 carried by the tilting arm and held in adjusted position by a lock nut 63. Stop screws 64 and 66 may be adjusted to limit the range of tilting movement of the carrying arm for the upper feed wheel 48. Since it is intended that the feed wheels 46 and 48 shall enter the grooves of the rod, it has been found desirable to provide a guide tube 49 for the rod which tube is supported on the bracket 36 by a lug 51 (Figs. 2 and 5) held by a screw 53. The tube is cut away at top and bottom to expose the rod to the feed wheels and at its entering end has internal ribs (not shown) to orient the grooves of the rod with the feed wheels.

The inner ends of the shafts 44 and 50 are interconnected by gears 68 and 70. The upper of these two gears is held on the shaft 50 by a set screw while the lower one is connected to the shaft 44 through a friction or slip clutch including a spring 72. The slip clutch for the lower feed roll shaft 44 includes a sprocket 74 which is connected by a chain 76 to another sprocket 78 upon a shaft 80 carrying a melting disk 82 turning in a chamber 84 provided by recessing the back plate 14 in the unit 10. Power is supplied to this drive shaft 80 from an independent source, such as an electric motor (not shown), so that it may be driven at a speed such as 30 R. P. M. which is best suited to the proper handling and the complete melting of the rod cement.

This melting unit 10 is of a type described and claimed in the above-mentioned Paulsen patent and has the chamber 84, formed in the plate 14, connected to the inlet 34 by a tangential passage 86 (Fig. 4). The chamber provides a curved surface gradually approaching the periphery of the disk to form a tapered passage in which the cement is melted and is carried along to an outlet portion 88 joining one side of a recess 90, formed in the plate 14 and containing intermeshing gears 92 and 94 of a delivery pump. Beyond the outlet portion the plate 14 meets the periphery of the disk and scrapes the liquid cement into the outlet portion. The pump forces the melted cement through a horizontal passage 96 joined to a vertical passage 98. The latter is connected to an inclined passage 100 which extends downwardly through the plate 14, the web 22 and the cover plate 18, which as noted above are formed integrally, where it has a horizontal rearward extension 102 (Fig. 5) terminating in an accumulator recess 104 (Fig. 4) formed in the rear plate 20 of the applying unit 16 adjacent to the upgoing side of an applying disk 106.

The passages 98 and 100 are formed by drilling the plate 14 and then closing the outer ends by plugs 99 and 101. The upper gear 92 of the delivery pump is mounted on a shaft 110 which extends forwardly through the cover plate 12 to receive a gear 112 (Fig. 1) meshing with a large gear 114 which is mounted on the driven shaft 80 of the melting unit (Fig. 5). To avoid leakage around the shafts 110 and 80 where they pierce the face of the cover 12 of the melting unit 10, they are provided with glands 116 and 118 (Fig. 5) cooperating with stuffing boxes surrounding the shafts. Similarly the other ends of these shafts 80 and 110 are journaled in antileakage bushings and holes in the casing are closed by hex-headed screws such as that shown at 120 (Fig. 5). Heat is supplied to the plates 12 and 14 of the melting unit by means of electric units 124 and 126 in the plate 12 and similarly positioned units 128 in the recessed plate 14. A thermostat 130 (Fig. 5) in the cover plate 12 is used to keep the temperature constant within this unit.

If there was an interruption in the delivery of blanks to the applying unit, then more cement would be supplied to the accumulator recess 104 in that unit than could be handled by the applying disk 106. Accordingly, we have provided a by-pass around the pump comprising a passage 132 formed by drilling the plate 14 of the casing and stopping the outer end of the hole by means of a screw 134. The inner end of the by-pass passage has a horizontal portion 136 joining it to the outlet portion 88. The action of this by-pass is controlled by means of a ball valve 138 (Fig. 3) seating against a shoulder at the end of a horizontal passage 96 which empties into the delivery passages 98, 100. The ball valve 138 is contained within a recess 140 into which opens, upon the side of the ball valve 138 which is nearer to the observer in Fig. 3, the by-passage 132. The ball valve 138 is held against its seat by a spring 142 the tension of which may be adjusted by means of a stem 144 traversing a packing chamber 143 and having an enlarged portion 145 threaded in an upstanding lug 146 which is mounted on the rear face of the plate 14 by means of a screw 148 extending through a flattened portion 150 of the lug 146.

An entrance block 152 is mounted upon the casing 10 near the inlet 34 and is provided with a passage for the rod 30 as it is received from the feeding unit. This entrance block 152 has a heating unit 154 under the control of a thermostat (not shown) so that the temperature of the block is less than that of the casing 10 but is slightly more than that of the surrounding air. The heat provided, however, is just enough to make the rod slippery and allow it to pass freely into the heating casing 10. An insulating block 156 is interposed between this entrance block and the casing 10. It will be understood that the two plates 12 and 14 of the melting unit are held together by screws such as that shown at 160 in Fig. 4. Similarly, the plates 18 and 20 of the applying unit are held together by screws indicated at 162 in Fig. 4. The applying disk is mounted on a shaft 166 journaled in these plates 18 and 20.

This shaft extends through the front face of the cover plate 18 for the reception of power from any suitable source which will enable the applying disk to be driven at a speed, for example 600 R. P. M., which will make the peripheral speed of the applying disk 106 essentially the same as the speed of lateral movement of blanks W such as that of which a fragment is shown in Fig. 2. The conveyor or other mechanism for presenting the blanks is no part of this invention and it only needs to be said that the arrangement is intended to be such that the margins of these blanks W will travel in a substantially horizontal path alongside and parallel to the rear face of the melting unit 10.

These blanks are held against the applying roll 106 by a presser member such as the edge of a circular disk 170 which is nonrotatably attached by a screw 172 to the inner end of a rod 174 carried in an enlarged portion 176 of a bent lever arm 178 having a forked portion 180 receiving a pivot pin 182. One side of the forked portion 180 has an overhanging extension 184 (Fig. 1) which rests upon the upper end of a spring-pressed plunger 186 carried in a bulge 187 (Fig. 5) at the rear face of a fixed bracket plate 188. The latter is held by clamp screws 190, one of which appears in Fig. 5, threaded in the tops of the hex-headed screws, one of which is shown at 120. It will be noted from Fig. 1 that the lower end of the fixed bracket 188 is turned upwardly to receive the pivot pin 182. The position of the periphery of the disk 170 vertically with respect to the top of the applying disk 106 is determined by a stop screw 191 threaded through the enlarged portion 176 of the arm 178 and this stop screw is held in adjusted position by a setscrew 192. It is found that this nonrotatable thin disk 170 is less likely to become gummed with undesired cement in case of a work stoppage than would a roller of proper dimensions. When the disk wears it can readily be turned by loosening the screw 172 (Fig. 5). In this applying unit the casing temperature is controlled by the provision of electric heating units 194 and 196 located in the front plate 18, as shown in Figs. 2 and 5.

As previously noted, the quantity of cement in the applying unit which is delivered to the work by the periphery of the disk 106 is controlled by a doctor roll 200 which is driven, as will be later described, in the same direction of rotation as the applying disk 106 with which it is associated. The location of this doctor roll with relation to the periphery of the applying disk can readily be adjusted because of the support of the doctor roll in a cylindrical bushing 202 which is received in a cylindrical recess in the casing 16 and extends from the front of the plate 18 into the recessed plate 20 to a position slightly beyond the periphery of the applying disk. It will be noted that the bushing is slabbed off at 204 forming a notch 206 which receives a portion of the applying disk and allows the periphery of the doctor roll to cooperate therewith. At the same time any adhesive clinging to the doctor roll is removed at a line 208 (Fig. 6) where the doctor roll reenters the bushing 202 and drains down the notch 206.

The correct relation between the doctor roll and the bushing axially of the two is determined by a retainer plate 210 held on the end of the bushing 202 by a screw 212 (Fig. 7) and having a notched end portion which engages a groove 214 in the doctor roll (Fig. 6). At a convenient point in the upper surface of the cover plate 18 holes are drilled and threaded for the reception of adjusting screws 216, 218 which seat in notches 220 and 222 formed in an upper portion of the bushing 202 upon opposite sides of its axis (Fig. 8). Due to the eccentric mounting of the doctor roll 200 in the bushing 202 it is possible, by a small adjustment of the screws, to make the peripheral portion of the doctor roll approach the periphery of the applying disk to any degree of separation.

The recess in the casing plate 20, which receives the applying disk 106, is separated from the lower portion of the periphery thereof by a narrow space, such as 20 thousandths of an inch, so that there is little tendency of the cement in the accumulator recess 104 to work back along the periphery of the disk against the drag provided by the periphery of the latter. This space is increased at 224, near the upper right-hand portion of the casing, and a string breaker roll 226 is set into the casing on a shaft 228 and is driven in a counterclockwise direction to bring back into the enlarged portion 224 such strings as may be formed by the cement between the leaving edges of pieces of work and this roll 226.

Power supplied to the shaft 166 of the applying disk is transferred to the doctor roll and the stripper roll by means of gears on the outside of the casing (Fig. 1). To this end, one large gear 230 on the shaft 166 meshes with a pinion 232 on the shaft 228 of the string roll 226. Furthermore, another gear 234 on the shaft 166 meshes with an idler gear 236 carried by a pin 238 extending into the casing plate 18 (Fig. 5) and this idler gear in turn meshes with a gear 240 upon an outward extension of the doctor roll 200 (Fig. 6).

In the use of the machine, rod cement is fed by the rod feeding mechanism to the inlet of the melting unit. As each portion of the rod passes around the periphery of the melting disk it is heated and squeezed and dragged along by that disk to the outlet 88 where, having been melted, it is taken over by the gear pump 92, 94 and forced through the outlet passage 100 to the applying unit and the accumulator recess 104 provided therein. This recess is designed to contain at least enough cement to treat one blank, in those cases where there has been a temporary interruption of activity, and will be replenished at a rate sufficient for the quantity of work being presented to the applying disk. This rate of delivery of melted cement may be controlled by means of the adjustable screw 145 of the by-pass mechanism which allows excess cement to be returned to the other side of the pump. The small quantity of cement left on the applying roll by reason of the spaces between the pieces of work will be returned to the disk-containing recess of the applying unit and carried eventually back to the accumulator recess. Any strings forming between the departing pieces of work and the applying roll will be broken by the string breaker roll 226 and also carried into the applying unit. Such an arrangement avoids the difficulties experienced when an applying device is positioned above the work and makes a clean, easily serviced applying mechanism.

Having thus described our invention, what we claim as new and desire to secure by Letters Patent of the United States is:

1. In a machine for applying thermoplastic cement supplied in a solid form, a melting unit, an applying unit, each of said units comprising a rotary member and a two-part casing containing said rotary member, each of said casings having one part which is recessed to receive the rotary member, the rotary member of the applying unit projecting through an aperture in the casing for contact with a piece of work moved past it, the recessed portion of the casing of the melting unit being aligned with the unrecessed portion of the applying unit and having a plate-like member connecting the two, said applying unit having an accumulator recess beside the outgoing portion of the rotary applying member, and a passage for conducting the melted cement starting adjacent to the rotary member in the melting unit through the interposed plate-like member and the respective casings to said accumulator recess.

2. In a machine for applying melted thermoplastic cement to pieces of work, a driven rotary applying member movable upon a horizontal axis, a two-part casing surrounding said rotary member and having one portion of the casing recessed to receive the same while a plane surface of the other portion bears against the face of said member, a driven doctor roll movable in the same direction of rotation as the applying roll and cooperating with the periphery thereof, and means for adjusting the position of said doctor roll toward and away from the applying roll comprising a rotary support for said roll which is turnable about an axis eccentric to the axis of the doctor roll, said rotary support having a portion notched to provide surfaces on opposite sides of the axis of said support, and screws threaded in said casing for contact with said notches at opposite sides of its axis to enable fine adjustment of the support and hence of the position of the doctor roll.

3. In an applying unit a casing recessed to receive a driven, thin cylindrical applying member, said casing being cut away to permit the applying member to project slightly beyond the casing to contact with the work, means for supplying cement to said applying member, and means for controlling the cement taken out by the applying member, said means comprising a substantially cylindrical bushing longer than the applying member is wide, a driven doctor roll eccentrically journaled in said bushing, a notch in said bushing to expose the doctor roll to cooperate with the applying member, said bushing having other notches providing shoulders at opposite sides of the axis of the bushing, and screws threaded in said casing cooperating with said shoulders to turn the bushing and to adjust the position of the doctor roll with respect to the applying member.

References Cited in the file of this patent

UNITED STATES PATENTS

| | | |
|---|---|---|
| 856,823 | Tickner | June 11, 1907 |
| 962,619 | Buffelen | June 28, 1910 |
| 966,453 | Lautenschlager | Aug. 9, 1910 |
| 986,062 | Illingworth | Mar. 7, 1911 |
| 1,549,576 | La Bombard et al. | Aug. 11, 1925 |
| 1,943,322 | Johnson | Jan. 16, 1934 |
| 2,260,255 | Leary | Oct. 21, 1941 |
| 2,649,758 | Cowgill | Aug. 25, 1953 |
| 2,711,713 | Czarnecki | June 28, 1955 |
| 2,726,629 | Paulsen | Dec. 13, 1955 |
| 2,783,735 | Paulsen | Mar. 5, 1957 |